United States Patent [19]

Brockhaus

[11] 4,304,220

[45] Dec. 8, 1981

[54] SOLAR COLLECTOR

[75] Inventor: Peter B. Brockhaus, Owen, Wis.

[73] Assignees: Larry Stork, Menomonie; Patrick J. Bushek, Eau Claire, both of Wis. ; a part interest to each

[21] Appl. No.: 114,865

[22] Filed: Jan. 24, 1980

[51] Int. Cl.³ ............................................. F24J 3/02
[52] U.S. Cl. .................... 126/422; 126/429; 126/450; 126/448; 236/49
[58] Field of Search ............................... 126/428–431, 126/432, 450, 419, 422, 448; 236/49, 93 R; 403/371, 372, 326

[56] References Cited

U.S. PATENT DOCUMENTS

| | | | |
|---|---|---|---|
| 2,012,527 | 8/1935 | Batchelder, Jr. | 236/49 |
| 3,990,635 | 11/1976 | Restle et al. | 126/429 |
| 4,100,914 | 7/1978 | Williams | 126/429 |
| 4,228,787 | 10/1980 | Steinemann | 126/433 |
| 4,237,865 | 12/1980 | Lorenz | 126/422 |

*Primary Examiner*—James C. Yeung
*Attorney, Agent, or Firm*—Wheeler, House, Fuller & Hohenfeldt

[57] ABSTRACT

Disclosed herein is a tube type solar heating device in which room air is circulated through tubes located exteriorly of the building and confined in an enclosure having a reflector. The temperature of the air discharged from the outlet of the tubes is controlled by an adjustable bimetal coil which is supported on the upper door in the outlet and connected to the lower door in the inlet by a cable. The control of air flow through the tubes provides uniform temperature of the air discharged. Fans located in the tubes and connected to a separate thermostatic control are energized when the air in the solar collector reaches a preselected temperature. The fans are provided with quick change mounts which facilitate installation.

3 Claims, 8 Drawing Figures

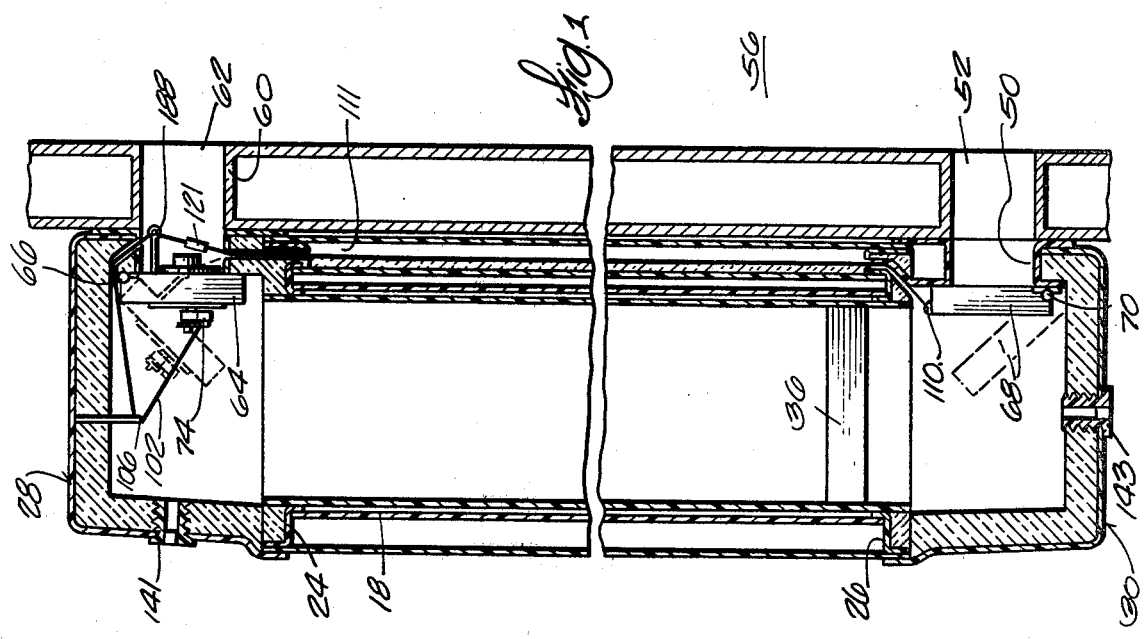
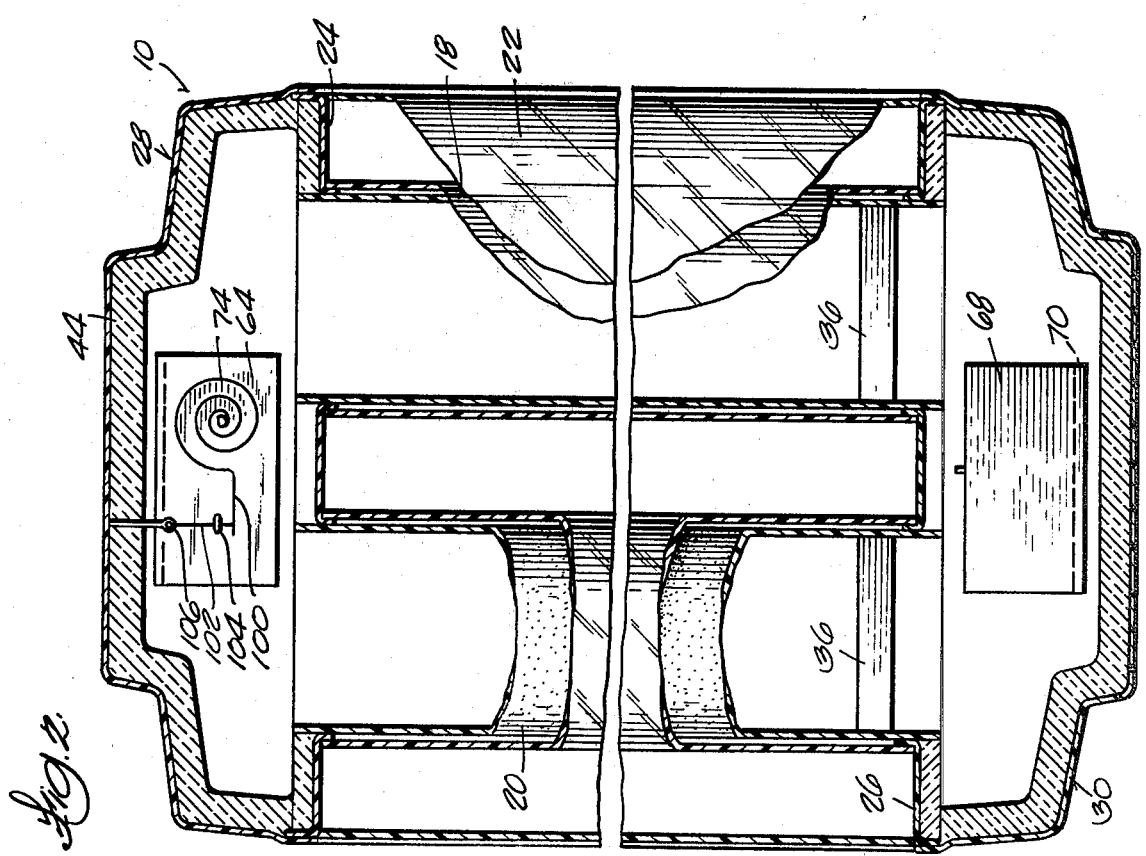

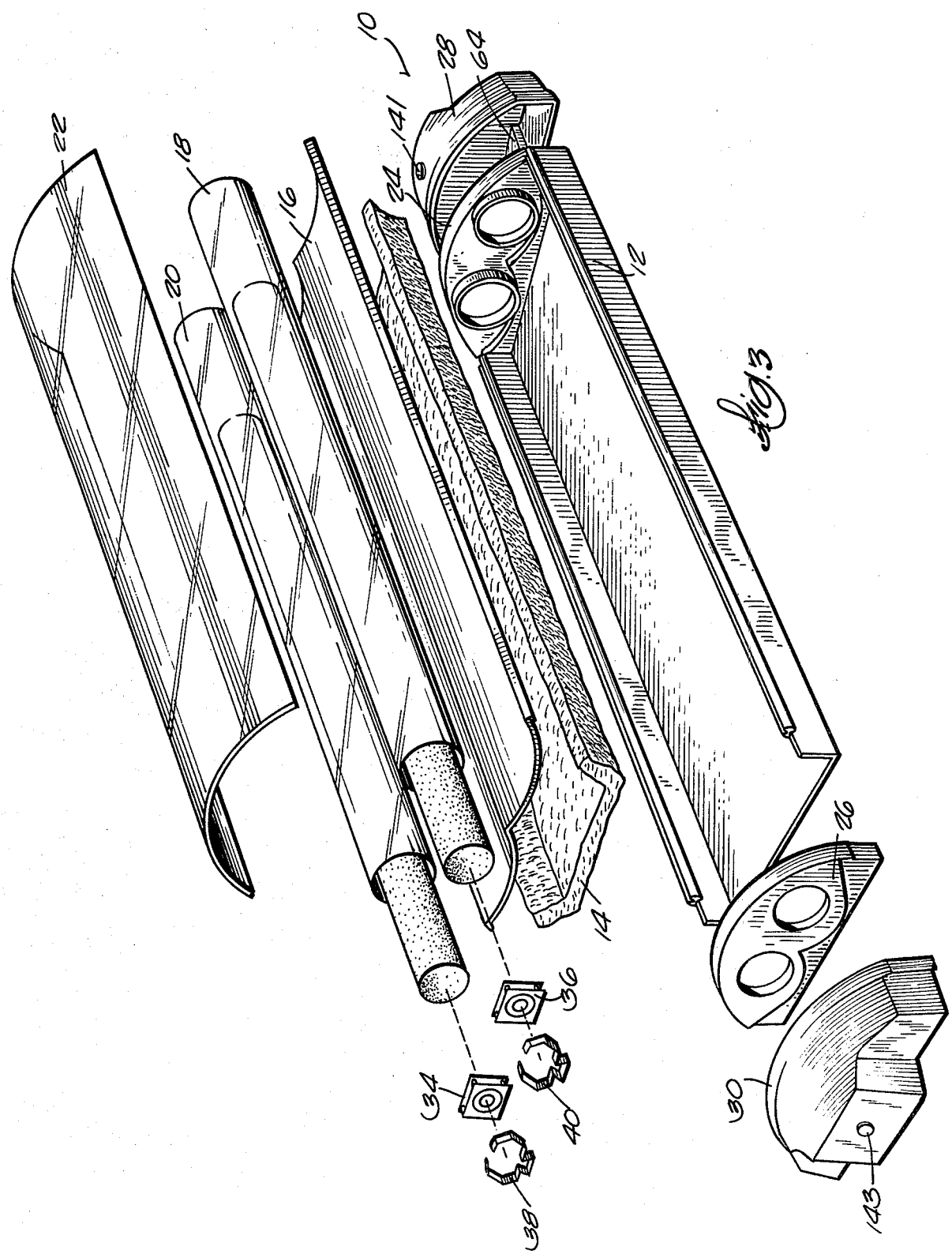

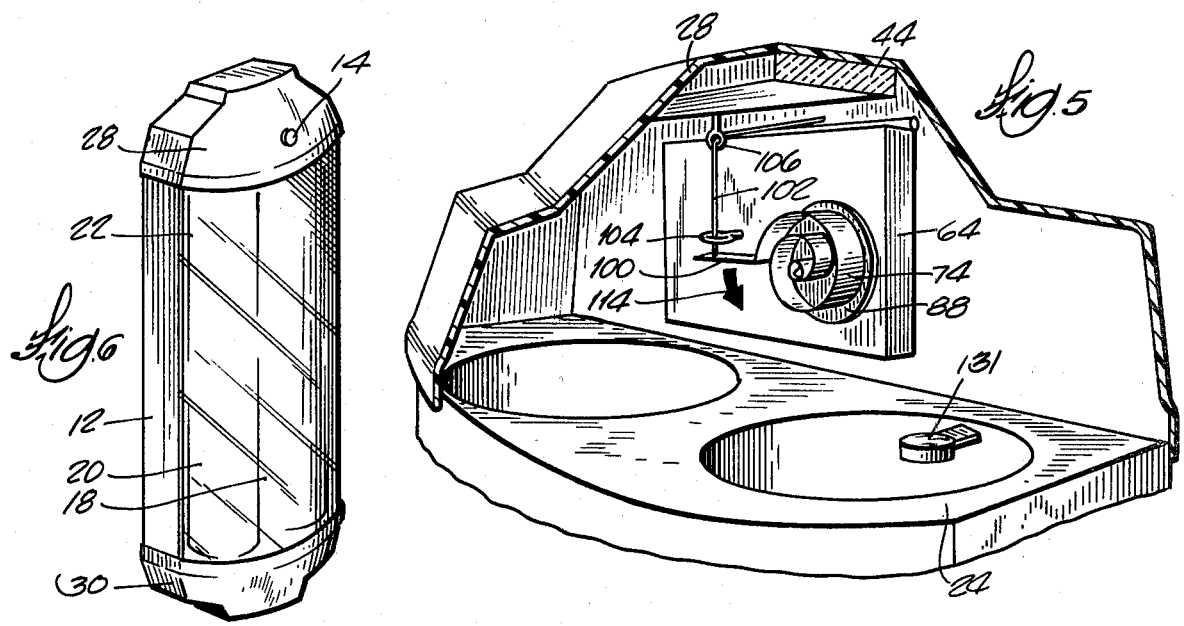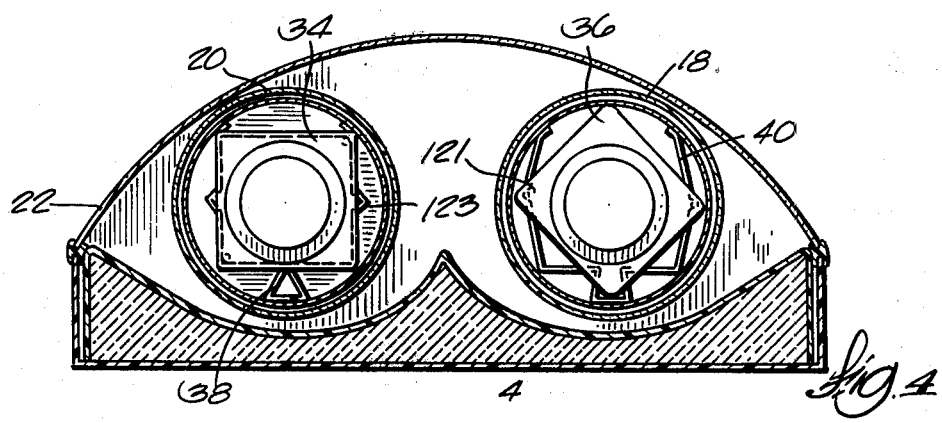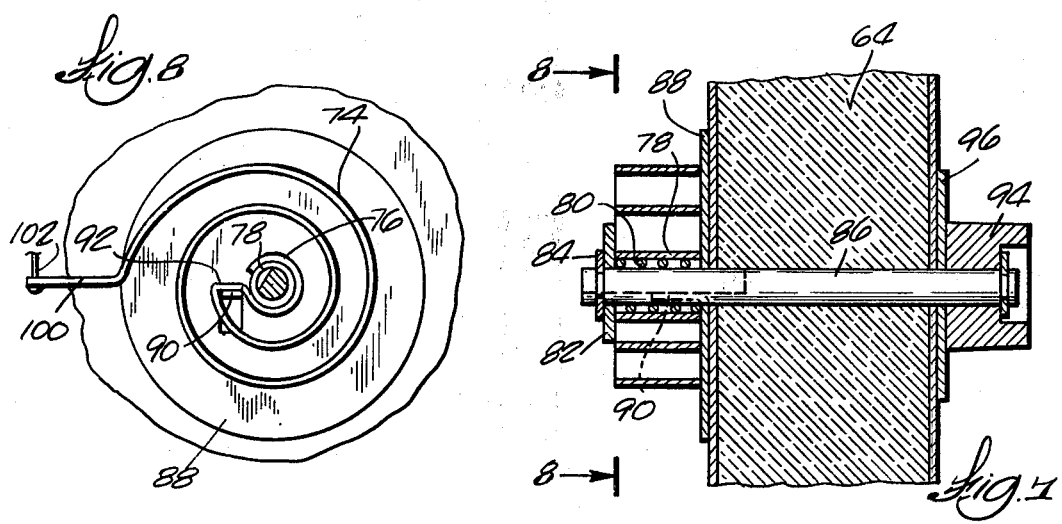

SOLAR COLLECTOR

BACKGROUND OF THE INVENTION

The invention relates to a solar heating device of the type in which room air exits the room adjacent the floor and enters a tube-type solar collector where it is heated and returns to the room at the top of the collector. These devices depend on convection, with heated air rising and cooler air being drawn into a lower inlet to provide a siphoning effect. The temperature of the air exiting from the outlet varies depending on the extent of solar radiation at the moment and the temperature of the incoming air.

SUMMARY OF THE INVENTION

The invention provides thermostatically controlled doors for the inlet and outlet, with mechanical connection to a bimetal coil on the upper door to regulate the opening and closing of the inlet and outlet doors to control volume of air flow into the collector to maintain a constant selected outlet air temperature irrespective of irregularities in solar radiation during the day. A fan is provided to increase air flow through the tubes when the collector temperature reaches high levels. The doors partially open or partially close, depending on sensed air temperatures to regulate the outlet temperature of the air regardless of the radiation or inlet temperatures of incoming air. The bimetal coil is supported on a shaft which has a drive wheel with a projecting tab which engages one end of the coil. Adjustment of the position of the knob relative to a scale containing temperature information enables positioning of the coil to obtain the desired outlet air temperature.

The connection between the coil and the shaft can be released by turning the knob for summer use so that the doors will remain shut and the coil can swing freely on its own axis without being connected to the drive wheel tab.

The invention also provides mounting clips for the fans to mount the fans within the tubes. The mounting clips are in the form of spring bands with legs having annularly related junctures which permit the corners of the fan housing to be locked in place on turning of the fan housing 45°.

Further objects, advantages and features of the invention will be apparent from the disclosure.

DESCRIPTION OF THE DRAWINGS

FIG. 1 is an end view in fragmentary section of a solar heating device in accordance with the invention.

FIG. 2 is a side view of the device shown in FIG. 1.

FIG. 3 is an exploded view of the parts shown in FIGS. 1 and 2.

FIG. 4 is a sectional bottom view.

FIG. 5 is an enlarged fragmentary perspective view of the upper end of the collector.

FIG. 6 is a perspective view of reduced size of the exterior of a solar collector.

FIG. 7 is an enlarged sectional view of the bimetal control.

FIG. 8 is a view taken along lines 8—8 of FIG. 7.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 3, the solar collector 10 comprises a frame 12 in the form of a channel which receives a blanket of insulation 14 and a reflective mirror 16 having dual concave sections. Nested within each of the concave sections of the mirror are pairs 18 and 20 of concentric absorber tubes in which the inner tube is desirably painted black with suitable solar paint and the outer tubes are plexiglas or other transparent material. The pairs of tubes interfit in and are supported by tube mounting plates 24 and 26. The tubes are enclosed by an outer shield 22. The mounting plates interfit in upper and lower end caps, respectively, 28 and 30. The absorber tubes may be provided with fans 34 and 36 mounted in spring clips 38 and 40, as subsequently described. As illustrated in FIGS. 1 and 2, the end caps are desirably provided with insulation 44.

As illustrated in FIG. 1, the inlet 50 at the lower end of the solar device communicates through a duct 52 with a room 56 near the floor 58. Discharge from the outlet 62 of the device is through a duct 60.

In accordance with the invention, mechanical means are provided for controlling air flow through the collector and maintaining the air leaving the outlet 62 at a generally uniform temperature. Prior art devices employing the thermal siphon concept, where air traveled by convection and unregulated through the exteriorly and vertically oriented collector tubes, provided air discharge having varying temperatures. In the disclosed construction (FIGS. 1 and 2), the outlet 62 is provided with a door 64 which is pivotally supported on end cap 28 by hinge 66. A lower door 68 is pivotally connected to end cap 30 by a hinge 70. The doors 64, 68 are desirably insulated to minimize loss of heat when not in use.

In the disclosed construction, the mechanical means also includes a bimetal coil 74 (FIG. 5) which, as illustrated in FIG. 8, has a tightly wound center coil portion 76 supported on a sleeve 78. A compression spring 80 located within the sleeve urges a washer 82 against a pin 84 or ring 84 at the end of the control shaft 86. The spring maintains the washer 82 in position and the washer provides lateral support for the bimetal coil and confines the coil against coil drive plate 88. The position of the bimetal coil relative to the door 64 is controlled by the shaft 86 and the drive plate 88 which has a projecting tab 90 which engages a loop portion 92 (FIG. 8) of the coil. A knob 94 with a pointer and temperature scale 96 are provided for convenience in adjusting the knob to regulate temperature, as hereinafter described.

The doors are connected to the bimetal by cable 102 which is connected to the free end 100 of the bimetal coil. The cable is trained through a guide or eye screws 104, 106 and a guide screw 188 on the front of the door 64 (FIG. 1). The cable thence runs through an aperture or gap 111 in the device and is connected at 110 to the lower door 68. Both doors 64 and 68 are gravity biased to certain positions. Door 64 is gravity biased to the closed solid line position (FIG. 1) and door 68 is gravity biased to the dotted line open position. In use, when the temperature in the upper end cap and adjacent the bimetal coil 74 increases and reaches a preselected level, the displacement of the coil will cause the coil 74 to move in the direction of arrow 114 (FIG. 5) and move the door to the dotted line open position shown in FIG. 1. The downward movement of the free end 100 of coil 74 pulls the cable downwardly to tighten the cable, and the tightened cable lifts the door 64 and the slack in the long vertical run of the cable lowers the inlet door 68.

As illustrated in FIG. 4, the fans 34 and 36 are supported in the tubes 18 and 20 by the clips 38 and 40. In FIG. 4, the fan 34 is shown in the position for installation, and in FIG. 4 the fan has been rotated 45° so that fan corner posts 121 register in notches 123 in the legs of the fan clips 38 and 40. The fans are thus held by spring pressure of the clips for use. The clips can be pop riveted, welded or otherwise secured inside the absorber tubes. This method also eliminates the need for having a separate grounding wire for the fan motors. The fans are desirably set at a higher temperature than that required to open the doors. For instance, the typical door opening temperature may be 70° but the thermostat 131 (FIG. 5) for the fans would be preset to energize the fans when a temperature of 110° is sensed, and the thermostat would be set to de-energize the fans at 90°. This would minimize cycling on and off of the fans.

As illustrated in FIG. 1, the collector is also provided with removable plugs 141 and 143 in the end caps, which can be opened in the summer to release heat and prevent severe heat buildup.

In use, the degree to which the upper and lower doors are opened controls the volume of air passing through the tubes. When the doors are partially open rather than full open, the restricted air flow through the tubes will result in increasing the temperature of the air exiting the collector. At night the thermostat results in the doors closing and in the morning the sun's radiation begins to heat the absorber surfaces and causes the bimetal coil to open the top door 64, allowing the collector to release heat to the room. As the absorber temperature increases, continued movement of the coil 74 and withdrawal of slack in cable 102 will cause the bottom door 68 to open slightly, allowing cooler floor level air to enter the collector and be heated. The upper door 64 is desirably adjusted so that it always opens to a greater extent than the bottom door to compensate for the increase in volume of air as the temperature of the air raises and causes expansion. When the temperature in the collector reaches a high level where convection alone is not adequate to remove heat by the chimney effect alone, the fans are energized by thermostat 131 by a circuit (not shown) to increase air flow through the tubes.

Foam gaskets can seal the doors in a closed position and magnetic latches can also be employed to maintain the doors in a closed position. The cable can be provided with a heat fusible coupling 121 (FIG. 5) which can be used to calibrate the scale 96 which will fuse at an excessive temperature to release the cable from the doors to allow the upper door to close. With the use of the cable, the top and bottom doors can be manually pushed open without upsetting the calibration.

In summer, the control knob can be rotated a three-quarter turn or the like to release the tab 90 from engagement with the bimetal. The friction of the washers 96 and 88 with the door 64 will maintain the knob and tab 90 at the desired location free of the bimetal. Because the bimetal coil 74 is freely supported on the shaft, the center turns of bimetal will move around the shaft without changing the position of the free end 100 in response to increase in temperature in the collector. The insulated doors thus will remain closed to insulate the house as they do in the winter when the solar collector is not supplying air to the room.

What is claimed is:

1. In a solar heating device having at least one absorber tube located in an enclosure, said enclosure having a transparent window forming one wall and a reflector within the enclosure to reflect sunlight against the tube and said enclosure having an inlet and outlet communicating with said tube and adapted to communicate through a building wall with the interior of the building, with the inlet adapted to withdraw cool air from adjacent a floor of the building and the outlet adapted to discharge heated air into the room above the floor, the improvement comprising first and second doors associated with said inlet and outlet for controlling flow into and from said inlet and outlet, mechanical means responsive to temperature connected to both of said doors and simultaneously controlling the position of said doors to regulate air flow therethrough to maintain a generally uniform temperature of air exiting the outlet, notwithstanding irregularities in solar radiation received and variations in temperature of air entering said inlet, said mechanical means including a bimetallic coil, said coil being supported on a manually movable control shaft mounted on said first door, means on said shaft frictionally engaging said door to afford positive positioning of said shaft at selected positions, and means on said engageable with said coil to change the angular position of portions of said coil relative to a reference point to change the temperature at which the coil is operative to open said doors to change the temperature or air leaving said outlet to a selected temperature.

2. The improvement of claim 1 wherein said means engageable with said shaft includes a projection on said shaft and said bimetallic coil has a flat engageable with said projection to enable twisting of said bimetal upon movement of said projection and shaft in one direction and release of said engagement upon rotation in the opposite direction to maintain said doors in a closed condition notwithstanding movement of said bimetallic coil in response to temperature changes.

3. In a solar heating device having cylindrical absorber tubes extending through a collector housing and having an inlet and outlet adapted to communicate through a building wall with interior of a room, the improvement comprising a fan mounting clip having a bight portion and two spring legs extending from the bight portion and having recesses intermediate the ends of the bight portions, said clip being sized to interfit into said absorber tube, and a fan having a housing with fastening elements and a periphery complementary in shape to the clip, and wherein said clip will receive said fan in one position and rotation of the fan housing 90° will cause said elements on said fan to snap into the recesses in said legs to secure the fan in the absorber tube.

* * * * *

UNITED STATES PATENT AND TRADEMARK OFFICE
CERTIFICATE OF CORRECTION

PATENT NO. : 4,304,220
DATED : December 8, 1981
INVENTOR(S) : Peter B. Brockhaus It is certified that error appears in the above—identified patent and that said Letters Patent is hereby corrected as shown below:

Column 4, Claim 1, Line 33 "shaft" should be inserted between --said-- and --engageable--

Column 4, Claim 1, Line 37 "or" should read --of--

Signed and Sealed this

Twenty-third Day of February 1982

[SEAL]

Attest:

GERALD J. MOSSINGHOFF

Attesting Officer      Commissioner of Patents and Trademarks